US009910923B2

(12) United States Patent
Reese et al.

(10) Patent No.: US 9,910,923 B2
(45) Date of Patent: *Mar. 6, 2018

(54) CONTEXT-BASED QUERYLESS PRESENTATION OF RECOMMENDATIONS

(71) Applicant: OpenTable, Inc., San Francisco, CA (US)

(72) Inventors: Corey Layne Reese, Portola Valley, CA (US); Brett Matthew Westervelt, Menlo Park, CA (US); Yige Wang, East Palo Alto, CA (US); Jeremy Ryan Schiff, Portola Valley, CA (US); Steven Charles Schlansker, Los Altos, CA (US)

(73) Assignee: OpenTable, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,713

(22) Filed: Sep. 20, 2016

(65) Prior Publication Data

US 2017/0011130 A1    Jan. 12, 2017

Related U.S. Application Data

(63) Continuation of application No. 14/201,713, filed on Mar. 7, 2014, now Pat. No. 9,449,106.

(Continued)

(51) Int. Cl.
*G06F 17/30* (2006.01)

(52) U.S. Cl.
CPC .. *G06F 17/30867* (2013.01); *G06F 17/30386* (2013.01); *G06F 17/30554* (2013.01)

(58) Field of Classification Search
None
See application file for complete search history.

(56) References Cited

U.S. PATENT DOCUMENTS

| | | |
|---|---|---|
| 6,370,513 B1 | 4/2002 | Kolawa et al. |
| 7,653,761 B2 | 1/2010 | Juster et al. |
| 7,818,394 B1 | 10/2010 | Lawler et al. |
| 7,876,214 B1 | 1/2011 | Brady, Jr. |
| 7,966,305 B2 | 6/2011 | Olsen |
| 8,095,432 B1 | 1/2012 | Berman et al. |
| 8,145,619 B2 | 3/2012 | Bowden et al. |
| 8,347,211 B1 | 1/2013 | Rogers et al. |

(Continued)

FOREIGN PATENT DOCUMENTS

| | | | |
|---|---|---|---|
| EP | 1288795 A1 * | 3/2003 | ....... G06F 17/30867 |
| WO | WO 03054760 | 7/2003 | |

OTHER PUBLICATIONS

European Patent Office, "Search Report" in application No. 12 815 207.1-1952, dated Jan. 24, 2017, 11 pages.

(Continued)

*Primary Examiner* — Farhan Syed
(74) *Attorney, Agent, or Firm* — Hickman Palermo Becker Bingham LLP

(57) ABSTRACT

Techniques for context-based queryless presentation of items are described. Without receiving an explicit query, an inferred query is determined based on a first set of context signals associated with a triggering event. Items matching the inferred query are selected based on a second set of one or more context signals associated with the triggering event. One or more results items identifying the one or more matching items are caused to display. Result items may be displayed in association with an explanation that identifies context values used to select an item or one or more attributes of the item that are relevant to a user or the inferred query.

20 Claims, 9 Drawing Sheets

Related U.S. Application Data

(60) Provisional application No. 61/775,389, filed on Mar. 8, 2013.

(56) References Cited

U.S. PATENT DOCUMENTS

| | | | |
|---|---|---|---|
| 8,359,285 | B1 | 1/2013 | Dicker |
| 8,510,287 | B1 * | 8/2013 | Wu .......................... G06F 7/00 707/706 |
| 8,572,129 | B1 | 10/2013 | Lee |
| 8,719,198 | B2 | 5/2014 | Zheng et al. |
| 8,868,538 | B2 * | 10/2014 | Mital ..................... G06F 3/0482 707/708 |
| 2001/0044759 | A1 | 11/2001 | Kutsumi |
| 2006/0200435 | A1 | 9/2006 | Finn et al. |
| 2006/0250935 | A1 | 11/2006 | Hamamoto |
| 2007/0050192 | A1 | 3/2007 | Gutta |
| 2007/0112761 | A1 | 5/2007 | Xu et al. |
| 2007/0118498 | A1 | 5/2007 | Song et al. |
| 2007/0239702 | A1 | 10/2007 | Vassilvitskii et al. |
| 2007/0282621 | A1 | 12/2007 | Altman et al. |
| 2008/0104059 | A1 | 5/2008 | Segel |
| 2008/0172374 | A1 | 7/2008 | Wolosin et al. |
| 2008/0214162 | A1 | 9/2008 | Ramer et al. |
| 2008/0215565 | A1 | 9/2008 | Sun et al. |
| 2008/0244429 | A1 | 10/2008 | Stading |
| 2009/0024605 | A1 | 1/2009 | Yang |
| 2009/0076928 | A1 | 3/2009 | Hjertonsson et al. |
| 2009/0157664 | A1 * | 6/2009 | Wen ..................... G06Q 10/047 |
| 2009/0177644 | A1 | 7/2009 | Martinez et al. |
| 2009/0204600 | A1 | 8/2009 | Kalik et al. |
| 2009/0222304 | A1 | 9/2009 | Higgins et al. |
| 2009/0234664 | A1 | 9/2009 | Schaffnit et al. |
| 2009/0234878 | A1 | 9/2009 | Herz et al. |
| 2009/0271246 | A1 | 10/2009 | Alvarez et al. |
| 2009/0293019 | A1 | 11/2009 | Raffel |
| 2010/0023508 | A1 * | 1/2010 | Zeng ................. G06F 17/30867 707/E17.014 |
| 2010/0076968 | A1 | 3/2010 | Boyns et al. |
| 2010/0211558 | A1 * | 8/2010 | Bonabeau ......... G06F 17/30864 707/706 |
| 2010/0250336 | A1 | 9/2010 | Selinger et al. |
| 2010/0306229 | A1 | 12/2010 | Timm et al. |
| 2010/0312724 | A1 | 12/2010 | Pinckney et al. |
| 2011/0125759 | A1 | 5/2011 | Querel et al. |
| 2011/0145066 | A1 | 6/2011 | Law et al. |
| 2011/0225235 | A1 * | 9/2011 | Schmidt ................. G06Q 30/02 709/203 |
| 2011/0225291 | A1 | 9/2011 | Dobroth et al. |
| 2011/0231383 | A1 | 9/2011 | Smyth et al. |
| 2011/0295852 | A1 * | 12/2011 | Wang ................ G06F 17/30867 707/728 |
| 2012/0209839 | A1 * | 8/2012 | Andrews ................ G06Q 10/10 707/728 |
| 2012/0233191 | A1 | 9/2012 | Ramanujam |
| 2012/0295640 | A1 * | 11/2012 | Mei ........................ G06Q 30/02 455/456.3 |
| 2012/0298640 | A1 | 11/2012 | Mei |
| 2013/0041837 | A1 | 2/2013 | Dempski et al. |
| 2014/0258270 | A1 | 9/2014 | Reese et al. |
| 2014/0289228 | A1 | 9/2014 | Mei et al. |
| 2014/0344718 | A1 * | 11/2014 | Rapaport ................ H04L 51/32 715/753 |
| 2015/0193498 | A1 * | 7/2015 | Weatherhead .......... G06F 17/30 707/722 |

OTHER PUBLICATIONS

European Cairns in application No. 12 815 207.1-1952, dated Jan. 2017, 3 pages.
Berner, U.S. Appl. No. 13/553,599, filed Jul. 19, 2012, Office Action, dated Jan. 31, 2017.
Schiff, U.S. Appl. No. 13/274,226, filed Oct. 14, 2011, Final Office Action, dated Apr. 6, 2017.
U.S. Appl. No. 13/553,599, filed Jul. 19, 2012, Office Action, dated Oct. 16, 2013.
U.S. Appl. No. 13/274,235, filed Oct. 14, 2011, Final Office Action, dated Jan. 28, 2014.
U.S. Appl. No. 13/274,226, filed Oct. 14, 2011, Final Office Action, dated Feb. 24, 2015.
U.S. Appl. No. 13/274,226, filed Oct. 14, 2011, Interview Summary, dated Dec. 16, 2014.
U.S. Appl. No. 13/274,226, filed Oct. 14, 2011, Office Action, dated Jul. 29, 2014.
U.S. Appl. No. 13/274,235 filed Oct. 14, 2011, Office Action, dated Aug. 18, 2015.
U.S. Appl. No. 13/274,235, filed Oct. 14, 2011, Final Office Action, dated Feb. 23, 2015.
U.S. Appl. No. 13/274,235, filed Oct. 14, 2011, Notice of Allowability, dated Apr. 1, 2016.
U.S. Appl. No. 13/274,235, filed Oct. 14, 2011, Notice of Allowance, dated Mar. 7, 2016.
U.S. Appl. No. 13/274,235, filed Oct. 14, 2011, Office Action, dated Aug. 26, 2014.
U.S. Appl. No. 13/553,599, filed Jul. 19, 2012, Final Office Action, dated Apr. 22, 2015.
U.S. Appl. No. 13/274,226, filed Oct. 14, 2011, Office Action, dated Jun. 3, 2016.
U.S. Appl. No. 13/553,599, filed Jul. 19, 2012, Office Action, dated Oct. 2, 2014.
U.S. Appl. No. 14/201,713, filed Mar. 7, 2014, Office Action, dated Feb. 12, 2016.
U.S. Appl. No. 13/553,599, filed Jul. 19, 2012, Office Action, dated Sep. 17, 2015.
U.S. Appl. No. 13/553,646, filed Jul. 19, 2012, Notice of Allowance, dated Apr. 16, 2015.
U.S. Appl. No. 13/553,646, filed Jul. 19, 2012, Office Action, dated Nov. 4, 2014.
U.S. Appl. No. 13/553,684, filed Jul. 19, 2012, Notice of Allowance, dated Feb. 5, 2015.
U.S. Appl. No. 13/553,684, filed Jul. 19, 2012, Office Action, dated Jan. 12, 2016.
U.S. Appl. No. 13/553,684, filed Jul. 19, 2012, Office Action, dated Jul. 17, 2014.
U.S. Appl. No. 13/553,684, filed Jul. 19, 2012, Office Action dated Jan. 12, 2016.
U.S. Appl. No. 13/553,703, filed Jul. 19, 2012, Notice of Allowance, dated Jul. 6, 2015.
U.S. Appl. No. 13/553,703, filed Jul. 19, 2012, Office Action, dated Dec. 31, 2014.
U.S. Appl. No. 14/201,713, filed Mar. 7, 2014, Notice of Allowance, dated May 12, 2016.
U.S. Appl. No. 13/553,599, filed Jul. 19, 2012, Final Office Action, dated Jun. 5, 2014.
Australian Patent Office, Examination Report No. 2, in application No. 2012283930, dated Oct. 27, 2015, 5 pages.
"Implicit", Merriam-Webster, http://www.merriam-webster.com/dictionary/implicit, accessed May 20, 2016, 8 pages.
Canadian Intellectual Property Office, "Exam Report" in application No. 2,842,215, dated Jul. 8, 2015, 3 pages.
Canadian Claims in application No. 2,842,255, dated Jun. 2016, 6 pages.
Canadian Claims in application No. 2,842,215, dated Jun. 2016, 7 pages.
Canadian Cairns in application No. 2,842,215, dated Jul. 2015, 8 pages.
Canadian Claims in application No. 2,842,213, dated Sep. 2015, 7 pages.
Canadian Intellectual Property Office, "Office Action" in application No. 2,842,213, dated Aug. 5, 2016, 3 pages.
Blount, S., "Talking Yellow Pages, Buyers in 20 Cities Now Let Their Fingers Do the Talking Through Automated Telephone Advertising Message Systems", vol. 10, No. 10, dated Oct. 1, 1987, 1 page.
Canadian Intellectual Property Office, "Office Action" in application No. 2,842,255, dated Jun. 27, 2016, 5 pages.

(56) References Cited

OTHER PUBLICATIONS

Australian Patent Office, "Patent Examination Report No. 1" in application No. 2012283930, dated May 5, 2015, 3 pages.
Australian Patent Office, "Patent Examination Report No. 1" in application No. 2012283928, dated May 12, 2015, 3 pages.
Australian Patent Office, "Patent Examination Report No. 1" in application No. 2012283929, dated Jun. 11, 2015, 3 pages.
Australian Claims in application No. 2012283930 dated Oct. 2015 6, pages.
Australian Claims in application No. 2012283930 dated Oct. 2015 6 pages.
"Inferred", Merriam-Webster, http:/www.meriam-webster.com/dictionary/inferred, accessed May 20, 2016, 9 pages.
Canadian Claims in application No. 2,842,213, dated Aug. 2016, 11 pages.
Claims in European Application No. 12815280.8-1952, dated Jan. 2015, 4 pages.
International Searching Authority, "Search Report" in application No. PCT/US12/47476, dated Oct. 1, 2012, 11 pages.
International Searching Authority, "Search Report" in application No. PCT/US12/47475, dated Sep. 17, 2012, 24 pages.
International Searching Authority, "Search Reoprt" in application No. PCT/US12/47473, dated Oct. 10, 2012, 17 pages.
European Patent Office, "Search Report" in application No. 12815280.8-1952, dated Jan. 5, 2015, 8 pages.
European Patent Office, "Search Report" in application No. 12814832.7-1952 dated Mar. 25, 2015, 3 pages.
European Patent Office "Search Report" in application No. 12815207.1-1952, dated Mar. 20, 2015, 13 pages.
Canadian Intellectual Property Office, "Examier Report" in application No. 2,842,255, dated Jul. 2, 2015, 5 pages.
European Claims in application No. 12814832.7 1952 dated Mar. 2015, 5 pages.
International Searching Authority, "Search Report" in application No. PCT/US12/47478, dated Oct. 12, 2012, 19 pages.
Claims in Canadian Application No. 2,842,255, dated Jul. 2015, 5 pages.
Claims in Australian Application No. 2012283930, dated May 2015, 5 pages.
Claims in Australian application No. 2012283929, dated Jun. 2015, 8 pages.
Claims in Australian Application No. 2012283928, dated May 2015, 9 pages.
Canadian intellectual Property Office, "Search Report" in application No. 2,842,215, dated Jun. 2, 2016, 4 pages.
Canadian Intellectual Property Office, "Office Action", in application No. 2,842,213, dated Sep. 1, 2015, 3 pages.
European Claims in application No. 12815207.1-1952, dated Mar. 2015, 3 pages.
Canadian Intellectual Property Office, "Search Report" in application No. 2,842,255, dated Jun. 1, 2017, 3 pages.
Canadian Claims in application No. 2,842,255, dated Jun. 1, 2017, 6 pages.

* cited by examiner

CONTEXT-BASED QUERYLESS PRESENTATION OF RECOMMENDATIONS

BENEFIT CLAIM

This application claims the benefit under 35 U.S.C. § 120 as a continuation of application Ser. No. 14/201,713, filed Mar. 7, 2014, which claims the benefit under 35 U.S.C. § 119(e) of provisional application 61/775,389, filed Mar. 8, 2013, the entire contents of which are hereby incorporated by reference for all purposes as if fully set forth herein.

FIELD OF THE DISCLOSURE

The disclosure generally relates to recommending items and, more specifically, to determining items at a specific client device based on context and without having received an explicit specification of query parameters from a user device or only having receiving a limited number of explicit query parameters from the user device before providing items. SUGGESTED GROUP ART UNIT: 2165; SUGGESTED CLASSIFICATION: 704/795.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer users often wish to receive recommendations for certain goods, services or other items, such as restaurants. However, most approaches for recommending items include requiring the user to answer a number of questions related to the item for which the user seeks a recommendation. For example, a user may search for a restaurant by first specifying the region in which the search should be located, the type of cuisine that interests the user, and the amount of money the user is willing to spend, and sometimes the planned date and time of a meal. Recommendations are provided only after this data is received and used to select matching restaurants, thus requiring the user to exert effort and to explicitly provide information before receiving recommendations. Approaches that reduce user burden and that improve computing speed, efficiency and utility during the recommendation process are needed.

SUMMARY

The appended claims may serve as a summary of the invention.

Description of Example Embodiments

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
    2.1 Example Recommendation System
    2.2 Example Recommendation Process
        2.2.1 Determining an Inferred Query and Selecting Matching Items
        2.2.2 Displaying Recommendations
        2.2.3 Interactions With Recommendations
        2.2.4 Example Explanations
    3.0 Implementation Mechanisms—Hardware Overview

1. General Overview

Techniques for context-based queryless presentation of recommendations are described. "Queryless," in this context, means without receiving explicit user input or an explicit user query relating to an item. In an embodiment, a user may provide no explicit query parameters or only a limited number of query parameters before being provided with recommendations. A query may be inferred based on context values and a user may provide input to refine the inferred query.

An occurrence of a recommendation triggering event is determined. Without receiving an explicit query relating to an item in a database, an inferred query is determined based on a first set of one or more context signals associated with the recommendation triggering event. One or more items matching the inferred query are selected based on a second set of one or more context signals associated with the recommendation triggering event. One or more results items identifying the one or more matching items are caused to display.

By automatically displaying information about items matching an inferred query in response to an occurrence of a recommendation triggering event, a user may receive recommendations more conveniently than approaches that require the user to answer a number of questions before displaying any recommendations. In addition, by using a variety of information known about the user and other users, the recommendations may incorporate signals that a user may not himself be able to articulate or would be too numerous to efficiently articulate. Various embodiments may be used in the context of providing recommendations for restaurants, or any other goods or services.

2. Structural and Functional Overview

2.1 Example Recommendation System

Figure 1:
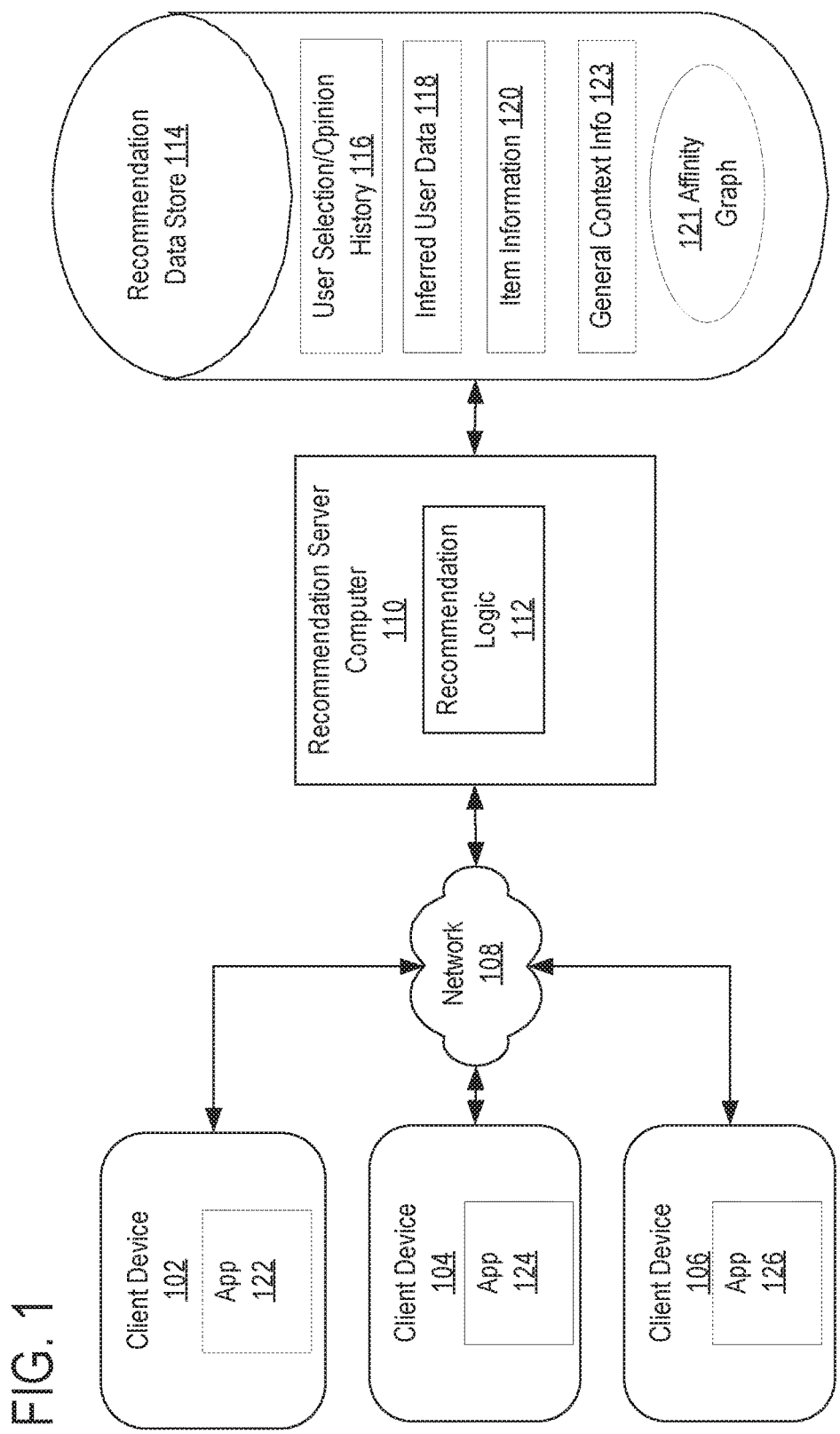
FIG. 1 illustrates an example recommendation system.

FIG. 1 illustrates an example recommendation system. Recommendation server computer 110 may comprise instructions for selecting recommendations and causing display of the recommendations at one or more client devices such as client devices 102, 104, 106. Client devices 102, 104, 106 each may comprise any of a variety of computing devices including, but not limited to, a personal computer, laptop, netbook or ultrabook, tablet, mobile phone, or wearable computing devices such glasses, contact lenses, implanted devices, or computational devices embedded in clothing.

Client devices 102, 104, 106 each host, execute or comprise respective instances of recommendation applications ("apps") 122, 124, 126, which comprise one or more computer programs or other software elements that are configured to perform the client-side functions that are further described herein. In some embodiments, a recommendation application may run within a web browser using browser-executable code and, in other embodiments, the recommendation application may be in an independent application executing on a client device. Recommendation applications 122, 124, 126 may cause the display of various recommendation interfaces described herein.

Communications between client devices 102, 104, 106 and recommendation server computer 110 may be sent via network 108, which broadly represents one or more local area networks, wide area networks, internetworks and internets, in any combination. For example, subscriber client devices 102, 104, 106 may couple to a wireless access point, a local internet service provider and the public internet via any of wired or wireless terrestrial, satellite, or other links.

Recommendation server computer 110 may be configured to select items to recommend, select information to display in association with the recommendations, and perform various operations related to recommended items in accordance with the instructions stored in recommendation logic. Information stored at storage units coupled to recommendation server computer 110, such as recommendation data store 114, may be used by the recommendation server computer to select items to display, select information to display, and perform various operations in association with recommendations. Recommendation data store 114 stores user selection/opinion history 116 indicating selections and opinions received from various client devices, inferred user data 118 inferred based upon information received directly from client devices or other sources, item information 120 including information relating to various items that may be recommended, and general context information 123 indicating information such as current weather or current traffic.

2.2 Example Recommendation Process

Figure 2:
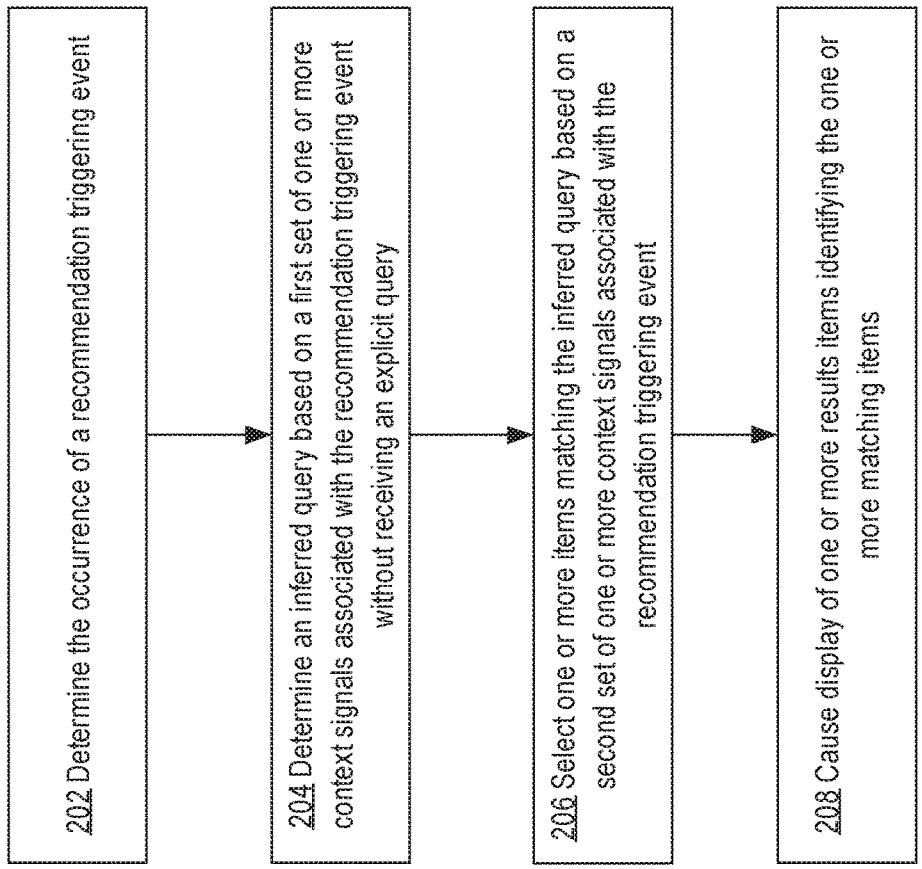
FIG. 2 illustrates a process for determining an inferred query and displaying information about items matching the inferred query.

FIG. 2 illustrates a process for determining an inferred query and displaying information about items matching the inferred query. The process of FIG. 2 may be performed at recommendation server computer 110.

At block 202, recommendation server computer 110 determines the occurrence of a recommendation triggering event. The recommendation triggering event may be a notification received from a client device indicating that, for example, recommendation app 122 has been launched by client device 102 or that client device 102 explicitly requested a recommendation by selecting an option to receive recommendations. Client device 102 may have requested a recommendation without specifying any specific query parameters or by specifying a limited number of query parameters. In some embodiments, recommendations may be provided without any indication of user action; the recommendation triggering event may be a determination by recommendation server computer 110 that a sufficient amount of relevant context information has been collected to recommend an item to a user associated with client device 102.

2.2.1 Determining an Inferred Query and Selecting Matching Items

At block 204, recommendation server computer 110 determines an inferred query based on a first set of one or more context signals associated with the recommendation triggering event without receiving an explicit query. The context signals used may be provided by client device 102 to recommendation server computer 110 or may be obtained from other sources.

At block 206, recommendation server computer 110 selects one or more items matching the inferred query based on a second set of one or more context signals associated with the recommendation triggering event.

Any combination of one or more context signals may be used to determine an inferred query, select items matching the inferred query, and/or determine an order for displaying the matching items. The context signals may include the time of day at which the recommendation triggering event occurs, the weather at the time the recommendation triggering event occurs, the identity of the present device or present user (i.e. the device that caused the recommendation triggering event or a user associated with such a device), the location of the present device, the identity or location of other users or devices associated with the present device or user, items previously selected or liked by the present device or user, demographic information known about the present user and/or or other associated users, transactional data associated with the present user or device, and query parameters explicitly provided by the present device.

As one example, based on a determination that the time of day is appropriate for brunch and that a user associated with the present device has searched for brunch locations in the past on days with similar weather, recommendation server computer 110 may automatically search for restaurants that specialize in brunch foods.

Context signals may take into account past user history, such as how all users, particular users, or the present users have behaved in certain situations, as well as present-time information. For example, a determination that other users belonging to the same age group as the present user frequently visit a particular category of restaurant may be used as a signal to select a restaurant belonging to the particular category for recommendation to the present user.

The selection of items to recommend may be based on information about the present user's tastes or interests or the tastes or interests of the present user's friends, and other information in an affinity graph 121. In various embodiments, an affinity graph 121 for each user may be stored in recommendation data store 114, constructed dynamically in main memory of recommendation server computer 110, or created in main memory of client devices 102, 104, 106 under control of applications 122, 124, 126. For example, an affinity graph 121 for each user of the recommendation server computer 110 may be stored using a table representation in a relational database hosted in recommendation data store 114. Each affinity graph provides a model of affinity between users and other users or between users and items or other entities, in general or with respect to an attribute of interest. An edge of the affinity graph may indicate a relationship between users or may indicate a liking or disliking for a kind of food.

An affinity graph edge may be associated with one or more weights that indicate the strength of a relationship, such as the extent to which a person trusts a doctor's expertise or whether the person is the doctor's top patient. The strength of a relationship between two users may be based on the quantity and/or quality of interactions between two users. For example, the strength of the relationship may be determined based on data the user makes available on a social networking website; recommendation server computer 110 may determine that the user frequently communicates with a second user on the social networking website or that the user has "followed" a second user on the social networking website. Alternatively, the strength of the relationship can be determined based on analyzing a user's phone call or text message history.

The relationship strength may be asymmetric; a weight indicating strength of a first person's relationship with a second person may be different than a weight indicating strength of a second person's relationship with the first person. For example, the affinity graph may indicate that a first person is a top friend of a second person while also indicating that the second person is only an acquaintance of the first person. This may be the case where, for example, the second person frequently initiates communications with the first person but the first person rarely initiates communications with the second person.

Affinity graph nodes may be augmented with additional information such as short form textual messages, pictures, financial transactions, check-ins or other explicit or implicit annotations used to denote a user has visited or prefers a location, and explicitly tagged content. The affinity graph may be constructed by people choosing to link themselves to other nodes by explicit input or by aggregation and analysis methods which infer the links and weights. Data representing the affinity graph may be stored at recommendation data store 114.

Recommendation server computer 110 may create and store data representing an inferred intention of the present user and may use the inferred intent to determine an inferred query or select matching items to present at the client device. The user's intention may be inferred by evaluating data such as the user's public or private messages (e.g. e-mail messages or messages on a social networking website), location data, transactional history, demographic data, and personal calendar. For example, based on a determination that the user is male, is not driving along his usual route, and has an upcoming appointment with a title that contains a female name and the word "birthday," recommendation server computer 110 may infer that the is interested in purchasing a gift for his wife. Alternatively, the user may explicitly identify his intention to recommendation server computer 110 by stating "I want to give Jane Doe a gift."

Intention may be long-term or short-term. For example, based on a user's financial records which show charges by gyms and health food stores, recommendation server computer 110 may determine that a user intends to visit locations that promote good health.

The user's emotional state may be another signal used to determine an inferred query or select items matching the inferred query. For example, based on a determination that the user is unhappy, recommendation server computer 110 may recommend eateries with popular desserts to a client device.

Intention or mood may be inferred based on natural language processing of messages provided by a user directly to recommendation server computer 110 or at other locations, such as on the user's social networking page. For example, based on a determination that a user recently used the word "I" more than five times in his most recent status updates, recommendation server computer 110 may infer that the user is unhappy. Recommendation server computer 110 may determine the user's mood for each day of the past five hours or five days, and use the average of the determined moods to determine what item to recommend to the user. In some cases, the user may explicitly specify his mood by, for example, posting his mood on a social networking website.

Recommendation server computer 110 may cause display of the inferred at a client device for verification by a user. The user's response to the verification request may be used to refine the selection or ordering of recommendations. For example, if the user indicates that he is not interested in buying a gift for his wife, context values indicating that the user is interested in buying a gift for his wife may not be used in the selection of the recommended item.

A client device may indicate location, temperature, or acceleration of the present user to recommendation server computer 110. The data received from the client devices may be combined with other information. For instance, data about weather or traffic may be inferred based on data from multiple client devices or may be obtained from other sources and combined with data from the present client device.

App 122 or recommendation server computer 110 may determine the present user or device's location based on an explicit check-in by the user or device or the location may be discovered algorithmically from other data. Location may be inferred based on a user's financial transaction data and based on known locations of various merchants identified in the transactional data. Additionally or alternatively, the client device's location may be determined based on a determination that the client device is in close proximity to communication devices, satellites (such as mobile phone towers, wireless network detection, or GPS), or other client devices. As another example, a user's location may be determined based on recognition of the user in an image captured by a camera whose location is known, based on analysis that occurs in real-time or after the fact. In some cases, the camera's location may be inferred based on an image of the user appearing with another person about whom location information is known or inferred. Location of a user may also be inferred from a message the user writes through natural language processing of the user's message traffic.

Recommendation server computer 110 may use transaction data to determine context signals including explicit transaction data such as credit card, loyalty program, and point of sale data. Transaction data also includes information inferred about transactions through a person's location and messages. For example, if a person is in a venue for paid entertainment, it may be inferred that someone paid for a ticket. Alternatively, a close relationship between a person and a third party may be inferred if it can be inferred that the person located in a venue did not pay for a ticket and that the third party was in close proximity to the person. Whether a person paid for the ticket may be determined by analyzing financial records made accessible to the system, including recommendation server computer 110, by the person or venue. In some embodiments, a user may explicitly identify who he is with to recommendation server computer 110. This information may be used, for example, to provide or alter recommendations based on information known about both people.

In some embodiment, a recommendation for a particular location may be displayed in association with a recommendation for specific items at the particular location. For example, a recommendation for a restaurant may be displayed in association with recommendations for specific dishes at the restaurant. In another embodiment, a recommendation for a specific activity at a resort may be displayed in association with a recommendation for the resort. The recommendation for the specific item at the location may be based on any combination of context values discussed herein.

Based on device location information and user financial transaction information, recommendation server computer 110 may also infer that a person attends one kind of restaurant when on business for which her employer pays, and another kind when she pays herself.

In an embodiment, machine-learning techniques may be used to select items to recommend based on the user's demographics or other information about the user. For example, if recommendation server computer 110 is recommending a place to visit, recommendation server computer 110 may determine which places other similar users visited, called, or made reservations at after being recommended different places.

If the context signals used do not result in any matches, recommendation server computer 110 may automatically disregard one or more context signals, potentially in a particular order until a certain number of items are determined to match the inferred query.

Figure 4:
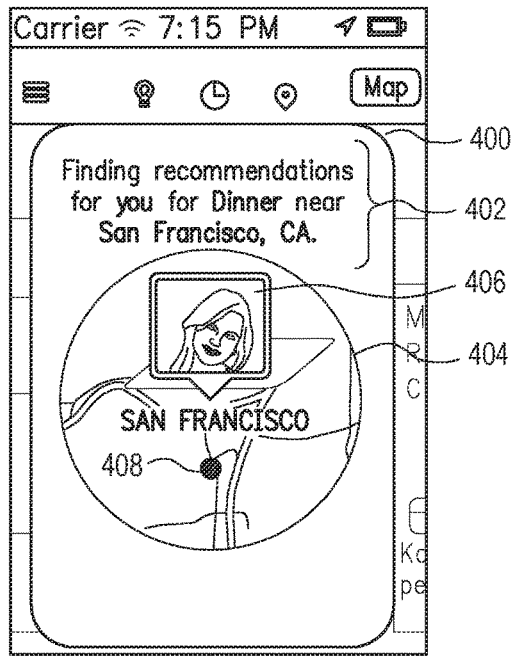
FIG. 4 illustrates a graphical interface displaying the parameters of an inferred query.

Some of the parameters of the inferred query may be identified to the user after the inferred query is determined. For example, FIG. 4 illustrates a graphical interface displaying the parameters of an inferred query. Recommendation server 410 may cause the display of interface 400 at a client device in response to detecting the occurrence of a recommendation triggering event associated with the client device. Query identifier 402, which states "Finding recommendations for you for Dinner near San Francisco, Calif." indicates that the meal type of dinner and city of San Francisco are query parameters. Additionally, marker 408 indicates the location of the user on a map and radius 404 indicates the search area within which the recommended item should be located. Image 406 is a profile picture of a user associated with the client device, such as a user currently logged into an account on the client device.

Interface 400 may be displayed only briefly. After interface 400 has been displayed for a certain amount of time, recommendation server computer 110 may automatically cause the display of a graphical interface identifying one or more result items matching the inferred query.

For purposes of illustrating a clear example, FIG. 4, FIG. 5, FIG. 6, FIG. 7, FIG. 8, FIG. 9, FIG. 10, FIG. 11, FIG. 12 depict the recommendation of a restaurant. However, other embodiments may be configured to recommend other goods, services or items including, but not limited to, bars, tourist destinations, stores, and items that are not associated with any physical locations. Although separate embodiments are discussed herein, any combination of embodiments and/or partial embodiments discussed herein may be combined to form further embodiments.

2.2.2 Displaying Recommendations

At block 208, recommendation server computer 110 causes display of one or more result items identifying the one or more matching items. The result items may be presented to a user in various ways. In an embodiment, a carousel of cards appears on the screen of the client device, where each card contains information about a different recommended item.

Figure 3:
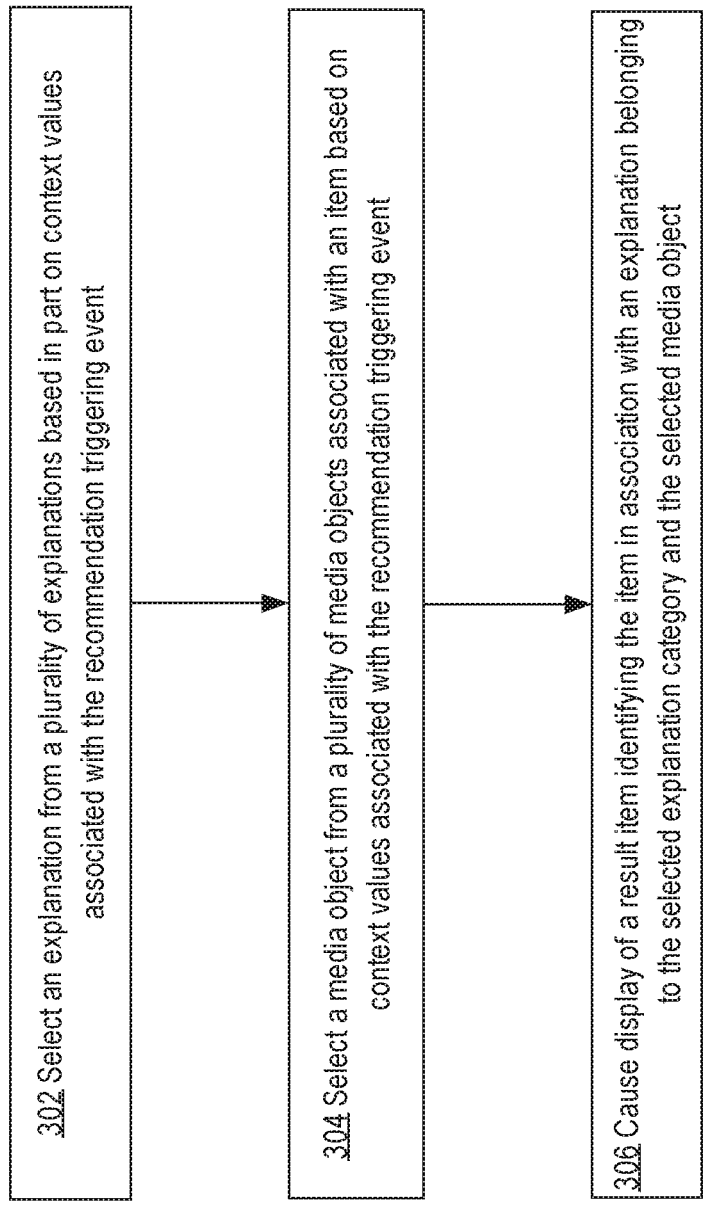
FIG. 3 illustrates a process for displaying an explanation and a media item in association with a result.

FIG. 3 illustrates a process for displaying an explanation and a media item in association with a result. The process of FIG. 3 may be performed at recommendation server computer 110. At block 302, recommendation server computer 110 selects an explanation from a plurality of explanations based in part on context values associated with the recommendation triggering event. At block 304, recommendation server computer 110 selects a media item from a plurality of media items associated with an item based on context values associated with the recommendation triggering event. The context values used to select the explanations may or may not be different than the context values used to select the media item. At block 306, recommendation server computer 110 causes display of a result item identifying the item in association with an explanation belonging to the selected explanation category and the selected media item. According to various embodiments, one or more of the steps of the processes illustrated in FIG. 3 may be removed or the ordering of the steps may be changed.

Figure 5:
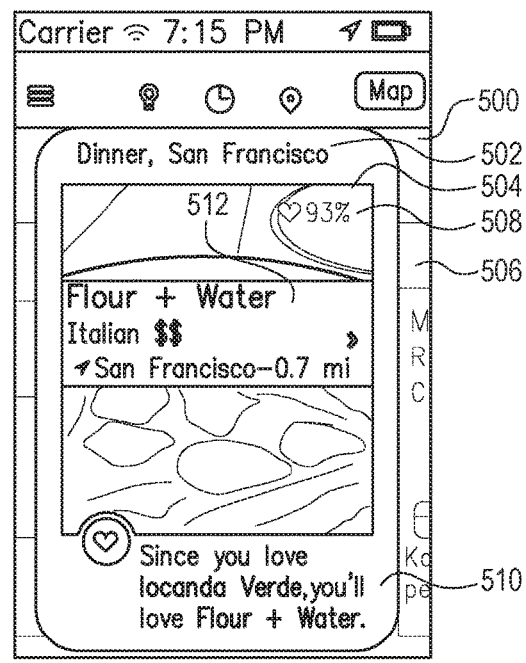
FIG. 5 illustrates a graphical interface identifying a recommended item in association with an explanation for the recommendation.

FIG. 5 illustrates a graphical interface 500 identifying a recommended item in association with an explanation for the recommendation. Area 512 of result item 504 displays information about the recommended restaurant including name, cuisine type, relative expense level, and distance from the current location of the client device. Query parameter indicator 502 indicates the parameters of the query for which the result item 504 is a match. Specifically, query parameter indicator 502 specifies the query parameters of "Dinner" and "San Francisco." Score 508 indicates how likely the user is to like the recommended item based on the context signals used by recommendation server computer 110 to generate the recommendation.

An explanation, such as explanation 510, may be displayed in association with a result item. The explanation may identify context values used by recommendation server computer 110 to select the recommended item or attributes of the recommended item that are relevant to the user or the inferred query. Explanation 510 may identify one or more context signals used by recommendation server computer 110 to select the restaurant identified in result item 504. Specifically, explanation 510, which states "Since you love Locanda Verde, you'll love Flour+Water," may indicate that a restaurant named Flour+Water was selected for recommendation based in part on the determination that the present user loved Locanda Verde.

Additional cards, such as result item 506, may be displayed in response to a user input such as the user swiping across the screen. In other embodiments, items can also be listed in a table or plotted on a map, or shown in a heads-up display.

According to different embodiments, users may provide input using any of a variety of methods including but not limited to voice commands, gesture controls, and movement of hands, eyes, or other body parts.

Figure 6:
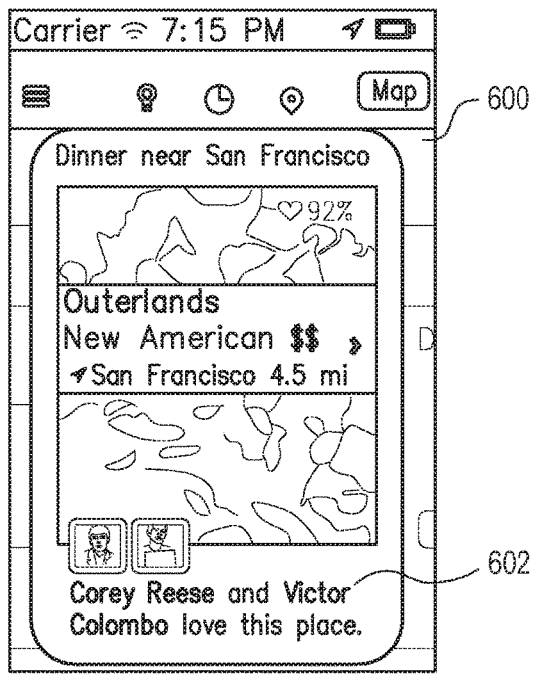
FIG. 6 illustrates another graphical interface identifying a recommended item in association with an explanation for the recommendation.

FIG. 6 illustrates another graphical interface identifying a recommended item in association with an explanation for the recommendation. Interface 600 displays explanation 602, which states "Corey Reese and Victor Colombo love this place." An explanation may indicate how the item was selected for presentation, or may simply identify informative or positive aspects of the item presented. For example, the existence of a relationship between Corey Reese and the user receiving the recommendation may have been a basis for the selection of Outerlands as a restaurant to recommend. In another embodiment, the explanation identifying the Corey Reese and Victor Colombo's preference may have been selected as an attribute of the recommended restaurant based on a determination that the user would find the explanation interesting or convincing.

Other types of explanations may include another user's review of the recommended item, where the other user is somehow related to the present user or shares common characteristics with the present user. Yet another explanation may identify a popular attribute of the recommended item. For example, an explanation stating "This place is great for brunch!" may be displayed based on a determination that users are often satisfied with a restaurant when it is visited during brunch hours.

In some embodiments, recommendation server computer 110 or another server in the system may prompt users for their opinions of various items visited or experienced by the users. Additionally or alternatively, recommendation server computer 110 may use other information to determine a user's opinion towards an item or frequency of contact with an item, such as inferred user intentions, transactional data, and affinity graph data.

An explanation may be selected for display based on information known about the user receiving the recommendation. For example, by analyzing user expressions of interest in previously-recommended items, recommendation server computer 110 may learn that women are more likely to express interest in an item that is displayed in association with an explanation that indicates that a friend of the user liked, visited, or reviewed the item (i.e. "social" explanations), whereas men are more likely to express interest in an item when it is displayed in association with an explanation that indicates that the recommended item is similar to another item that the user liked (i.e. "familiarity" explanations). Based on such determinations, recommendation server computer 110 may select between different explanations according to an approach that makes the selection of a certain type of explanation more likely than a different type of explanation. For example, for a female user, recommendation server computer 110 may randomly select an explanation from a variety of explanations, where the random selection algorithm weighs "social" explanations more heavily than "familiarity" explanations. An embodiment of selecting an example based on gender is described to illustrate a clear example; however, in other embodiments explanations may be selected based on other information about the present user, present device, or inferred query including, but not limited to, the present device or user's interactions with previous recommendations, inferred preferences of the present user, location of the present device, and the time at which the recommendation triggering event occurred.

The recommendation server computer 110 may consider a user as expressing interest in an item if, for example, the user visits the item, calls the item, selects to view more information about the item, adds the item to a list, messages someone about the item, or performs some other action in association with the item.

Strength of relationships may also influence which explanation is selected for display. For example, recommendation server computer 110 may be more likely to display information about a first user's sentiment towards an item than a second user's sentiment towards the item based on a determination that the user receiving the recommendation has a stronger relationship with the first user.

Similar to how user, device, or inferred query information may influence the selection of an explanation, user, device, or inferred query information may also influence which media item from among a plurality of media items is selected for display in association with a recommended item. The media item may be an advertisement authored by the owner of the item being recommended. For example, when selecting a photograph to display in association with a recommendation to visit a bar, recommendation server computer 110 may select between a photograph of a martini glass at a bar and a photograph of people dancing at the bar based in part on information known or inferred about the user receiving the recommendation. In other embodiments, the media item shown may be in another format such as a video or audio.

In some embodiments, the information used to influence selections of explanations and media items may include any of a variety of information known or inferred about a user such as demographic information or observed preferences of the user. Demographic information may indicate broad categories to which the user belongs such as gender, race, national origin, disability, languages spoken, location, religion, occupation but may also indicate information inferred from the user's behavior. For example, a user's interests may be inferred based on messages posted by the user using his Twitter account.

2.2.3 Interactions with Recommendations

Users may provide input that alters or changes the context signals used by recommendation server computer 110 to determine the inferred query or to select items matching the inferred query. The input may be received by recommendation server computer 110 before or after recommended items are displayed.

Figure 7:
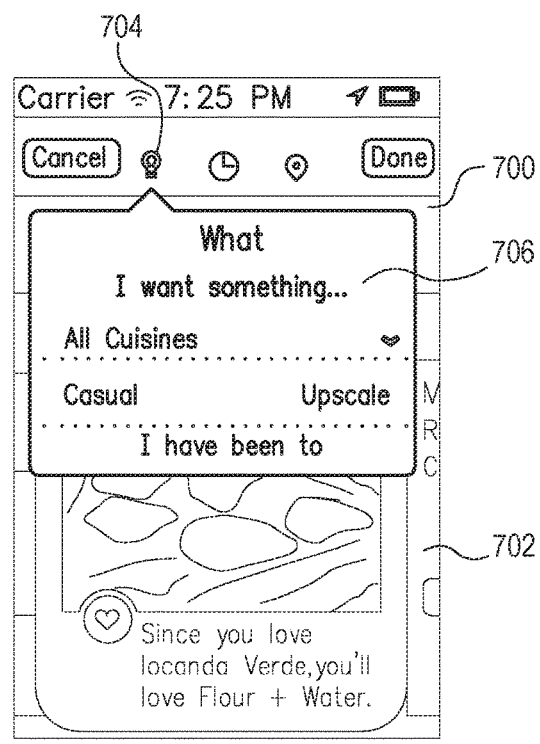
FIG. 7 illustrates a graphical interface displaying a menu by which a user may alter or refine the context signals used.

FIG. 7 illustrates a graphical interface displaying a menu by which a user may alter or refine the context signals that are used as a basis of recommendations. In an embodiment, selection of icon 704 in interface 700 may cause the display of menu 706, with which the user may provide explicit signals as a supplemental basis for recommendations. In an embodiment, user may specify a preferred cuisine or ambience by interacting with the options in menu 706; for example, a default option of ALL CUISINES may be modified using a drop-down menu or other GUI widget to select other cuisines, and a style option may be used to select from among a set of available item styles such as CASUAL, UPSCALE, etc. The user may also specify that he has already visited the recommended restaurant by selecting the option titled "I have been to" in menu 706. Closing the menu 706 or selecting an APPLY icon, or any equivalent action, causes the app 122 to update recommendation server computer 110 with data based upon the user's entries in menu 706 and to request updated recommendations that are based at least in part upon the entries.

Figure 8:
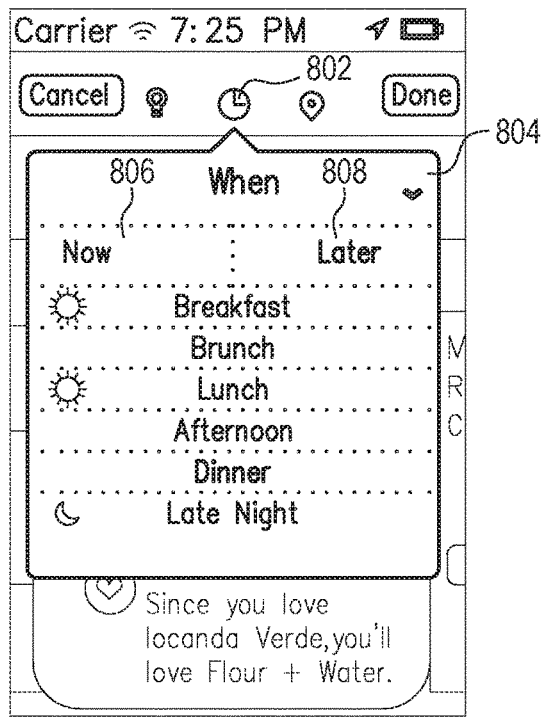
FIG. 8 illustrates another graphical interface displaying a menu by which a user may alter or refine the context signals used.

FIG. 8 illustrates another graphical interface displaying a menu by which a user may alter or refine the context signals used. In an embodiment, of a time icon 802 may cause the display of menu 804, using which the user may indicate the general time at which he wishes to visit a recommended restaurant. Example options include NOW option 806 and LATER option 808; in other embodiments, a specific time of day may be entered. A user may specify that he wishes to visit the recommended restaurant now by selecting option 806 or later by selecting option 808. In an embodiment, a time preference also may be specified by identifying a specific meal type, such as breakfast, brunch, lunch, afternoon, dinner, or late night dining. In an embodiment, closing the menu 804 or selecting an APPLY icon, or any equivalent action, causes the app 122 to update recommendation server computer 110 with data based upon the user's entries in menu 804 and to request updated recommendations that are based at least in part upon the entries. In some embodiments, meal type data such as LUNCH may be transformed at recommendation server computer 110 into a particular range of times.

Figure 9:
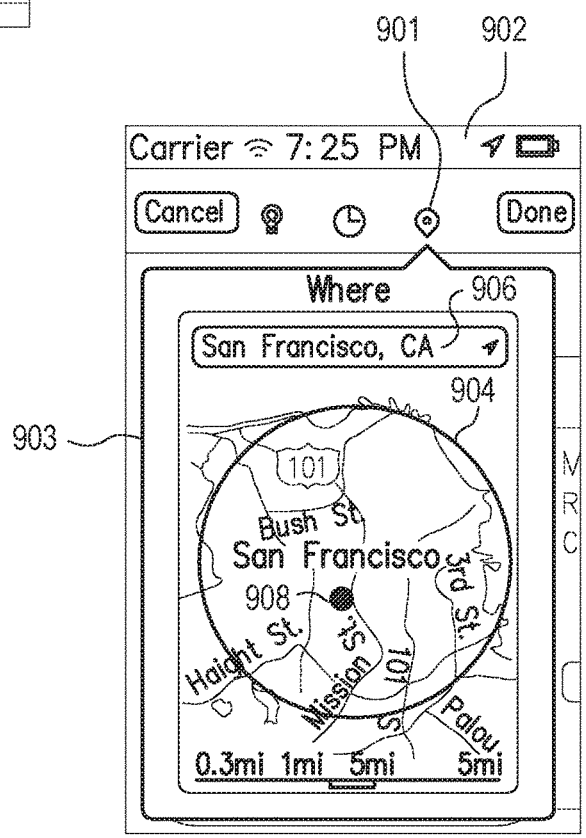
FIG. 9 illustrates a graphical interface displaying a radius that may be altered by a user to specify the preferred location of the recommended item

FIG. 9 illustrates a graphical interface displaying a radius that may be altered by a user to specify the preferred location of the recommended item. In an embodiment, screen display 902 of FIG. 9 includes a location icon 901 which, when selected, causes app 122 to display a location dialog 903. In an embodiment, if the user's mobile computing device is then currently coupled to a cellular data network or a wireless network, and the user has granted permission to app 122 to obtain device location information, then the app automatically issues a call to the device operating system to request location data, resolves the location data into a graphical map, and displays the graphical map in dialog 903. For example, as seen in FIG. 9, the user device is located approximately at a point 908 and a graphical map of the local region is created and displayed in dialog 903 with a radius 904. The radius 904 acts as a constraint upon the delivery of recommendation data to the device; in one embodiment, recommendations will relate only to restaurants that are within the radius. Additionally or alternatively, the user may specify his location by typing in the location explicitly in search bar 906. The user may indicate the region within which he prefers the recommended restaurant to be located by interacting with the screen to change the size of radius 904. For example, as a result of the user pinching outwards or inwards upon the screen, the search area and the size of radius 904 may change.

Figure 10:
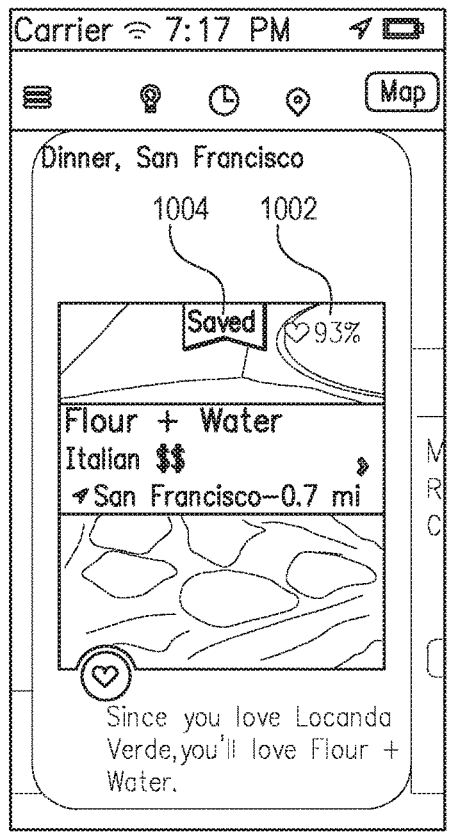
FIG. 10 illustrates a graphical interface that may display when a user performs a gesture associated with saving a result item to a list.
Figure 11:
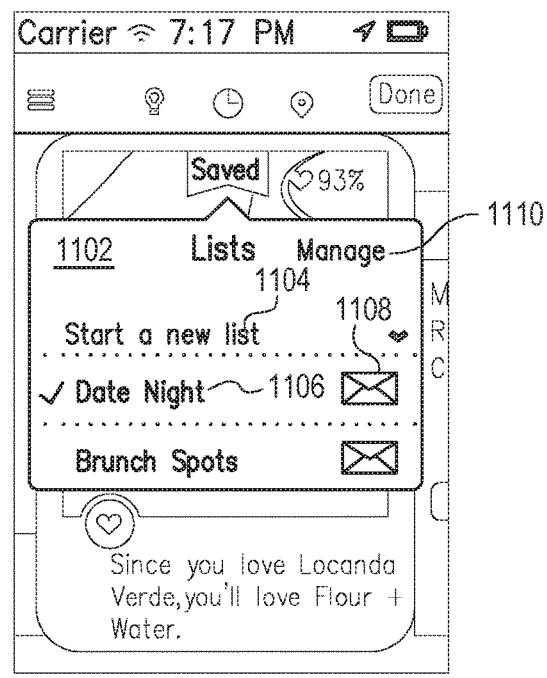
FIG. 11 illustrates a graphical interface displaying options to add a result item to a list of items.

FIG. 10 illustrates a graphical interface that may display when a user performs a gesture associated with saving a result item to a list. For example, a user may save a recommended restaurant shown in a result item 1002 that is then currently displayed in the device user interface by selecting and dragging result item 1002 downwards. In response to the gesture, notification 1004 may display, indicating that the recommended restaurant has been saved. Gestures other than downward swiping may be used in other embodiments. Saving may comprise storing a record of the result item 1002 in a favorites list. Additionally or alternatively, the gesture may cause app 122 to create and send data to the recommendation server computer 110 indicating that the user approves of the specified result item; that is, a gesture such as downward swiping effectively may indicate "user likes this item". FIG. 11 illustrates a graphical interface displaying options to add a result item to a list of items. Menu 1102 may display after the interface of FIG. 10 in response to a user selection to add the recommended restaurant to a list. By selecting list name 1106, the user may add the recommended restaurant to the "Date Night" list. By selecting option 1104, the user may create a new list and add the recommended item to the new list. By selecting option 1110, the user may manage the list. For example, the user may add or delete lists, add or delete items from lists, and manage properties of the list, such as whether the list is publicly available and whether other people can add items to the list. Option 1108 allows the user to email or message someone the Date Night list. In some embodiments, the selection of option 1108 causes recommendation app 122 or recommendation server computer 110 to generate a unique uniform resource locator (URL) for accessing the list. Recommendation server computer 110 or app 122 may send the list to one or more people identified by the user.

Figure 12:
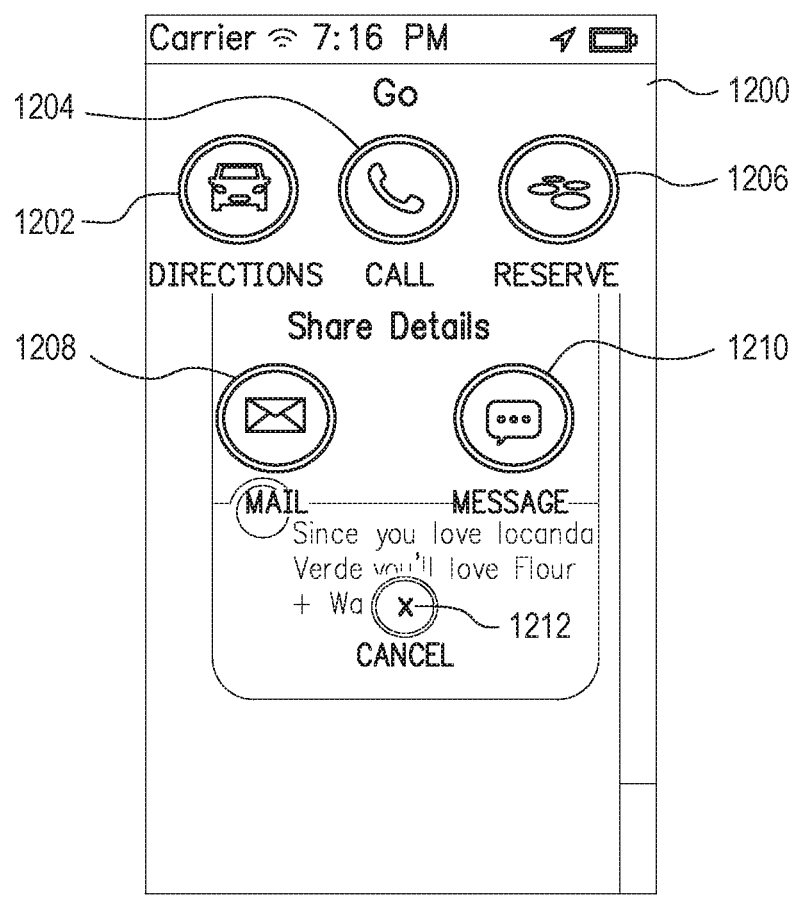
FIG. 12 illustrates a graphical interface displaying options to perform various operations upon a result item.

FIG. 12 illustrates a graphical interface displaying options to perform various operations upon a result item. Interface 1200 may display when a user selects a recommended item. In some embodiments, a user may select a recommended item by swiping the corresponding upwards. The selection of option 1202 causes the client device to display directions to the restaurant and option 1204 causes the client device to call the restaurant. The selection of option 1206 may cause recommendation server computer 110 or an associated server to make a reservation for the user at the selected restaurant. In response to the selection of option 1206, the client device may be redirected to another system or screen that prompts the user for a time and party size for the reservation. Option 1208 allows the user to email someone information about the recommended item and option 1210 allows the user to send someone information about the recommended item via a text message. By selecting option 1212, the user may return to the list of result items, and a graphical interface as illustrated in FIG. 5 may display.

In some embodiments, in response one or more items being selected for recommendation, the one or more items are automatically reserved for the present user. For example, recommendation server computer 110 or app 122 may cause a reservation at one or more selected restaurants to automatically be made in response selecting the one or more restaurants for recommendation. After the reservation has been made, app 122 may display a prompt indicating that the reservations have been made and requesting acceptance of the reservation within a certain time period. If an acceptance of the reservation is not received by the present device within the time period, recommendation server computer 110 may automatically cancel the reservation. For example, the reservation may be made for three days later but the reservation may expire if the present device does not confirm the reservation within a day. Recommendation server computer 110 may cause the reservation to be made by sending a message to a separate reservation server or by updating reservation data in a repository accessible to recommendation server computer 110.

In some embodiments, a user may provide feedback for a given recommendation. For example, a user may select a thumbs down or thumbs up option to indicate whether he likes the recommendation. Recommendation server computer 110 may use this information to alter what recommendations are provided to the same user or other users of the system. In some embodiments, the user may further be prompted to enter a reason for not liking the recommended item, for example, by entering input into a text box or selecting one or more of various displayed options. In some embodiments where the recommendations are displayed without the user requesting a recommendation, the recommendation application may offer to stop recommending items for a period of time in response to receiving a thumbs down button.

2.2.4 Example Explanations

An explanation may identify a statistic about a recommended item. The data may be identified in an impersonalized manner, such as average rating for the item or total number of times the item was mentioned across different types of user-generated content. The statistic may be personalized based on information known about the present user. The information known about the user may be the user's ratings of various items or check-ins associated with items. The identified data may be a prediction of how frequently the user is expected to visit the item, how much the person is expected to like the item generally, or how much the person is expected to like the item for a given context (e.g. "You will love this place for brunch.")

An explanation may contrast a statistic for an item that is generalized over a large number of users with a statistic for the item that is personalized to the present user. (e.g. "You will love this, most people think this is so-so.")

An explanation may state that an item is similar to other items the present user has interacted with, such as other items that the user has rated or checked-in at. Another explanation may identify explicit actions performed by the present user in connection with the client. For example, an explanation displayed in association with a recommendation for a particular place may state that the present user saved the particular place in a list, rated it five (5) stars, checked in five (5) times, offers a cuisine that the present user has stated her likes, is in a list of restaurants the particular user likes.

An explanation may identify location-relevant information. The location-relevant information may be a location-based statistic of the item ("This is the top sushi place in a given city.") The location-relevant information may contrast the present user's location to other location information known about the present user ("This is great for tourists, and we know you're out of town.")

An explanation may indicate information about other users. For example, an explanation may include a review authored by a friend of the present user. Alternatively or additionally, the explanation may state information determined based on analyzing the preferences of the other users associated with the present user (e.g. "Most of your friends love this place," "Five of your friends love this place" or "It's very popular among your followers.")

An explanation may identify information relevant to a given context that is determined to be relevant to the inferred query. For example, if a context signal of "brunch places" is determined to be relevant, an explanation of "The omelet is amazing may be displayed." As another example, the explanation may indicate that a particular item has lots of check-ins during lunch, is highly rated during lunch, or predicted to be highly rated for you during lunch.

An explanation may identify recent trends or observed activity in relation to the recommended item. The explanation may include a very recent review that is determined to be relevant to the inferred query or a recent statistic related to the item. For example, the explanation may state that there have been many of check-ins at the recommended item recently or that the recommended item has been rated high recently.

An explanation may also be directed to a group, where instead of a single present user context relevant to a plurality of present users are considered. An explanation directed to a group may be shown, for example, when a recommendation triggering event is associated with a plurality of different users.

This disclosure also includes an Appendix document providing detailed descriptions of a large number of example personalized and social explanations that may be used in an embodiment, the entire contents of which is hereby incorporated by reference as if fully set forth herein.

As used herein, a "likeness score" for a particular item indicates how likely the present user is to like the particular item.

3. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine customizable hard-wired logic, ASICs, or FPGAs with customizable programming to accomplish the techniques. The special-purpose computing devices may be desktop computer systems, portable computer systems, handheld devices, televisions, wearable computing devices, networking devices or any other device that incorporates hard-wired and/or program logic to implement the techniques.

Figure 13:
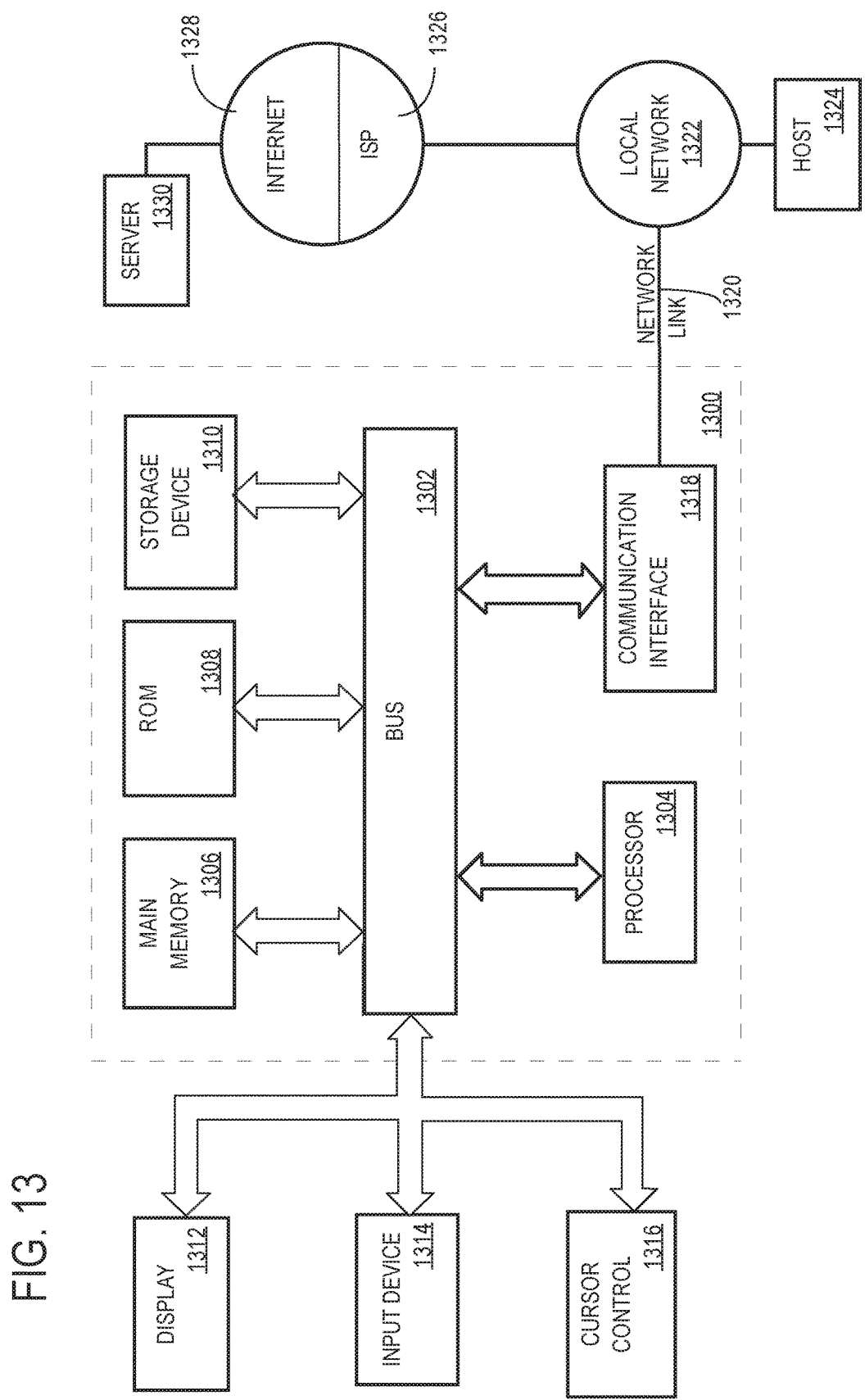
FIG. 13 is a block diagram that illustrates a computer system upon which embodiments of the invention may be implemented.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

In some embodiments, a customer interacts with computer system 1300 via touch, for example, by tapping or gesturing over certain locations. A display screen of display 1312 may also be capable of detecting touch.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
   one or more processors;
   one or more computer-readable storage media coupled to the one or more processors and storing one or more sequences of instructions which when interpreted cause:
   receiving data indicating that instructions for an application have begun executing on a computer device;

receiving from the computer device data regarding a triggering event that occurred when the instructions for the application were executed on the computer device, the triggering event being a user request for a recommendation that specifies a first set of parameters of the recommendation;

in response to receiving the data regarding the triggering event, causing the computer device to transmit a first set of context signals that were gathered at the computer device, wherein the first set of context signals comprise at least location information specifying a location of the computer device when the triggering event occurred;

receiving, from the computer device, the first set of context signals at the computer system;

without receiving an explicit query from the computer device, determining an inferred query that specifies a second set of parameters of the recommendation based at least in part on the location information from the first set of context signals associated with the triggering event, the second set of parameters being different from the first set of parameters;

selecting one or more items matching the inferred query based on at least in part on the first set of context signals associated with the triggering event; and causing display of one or more results items identifying the one or more matching items at the computer device.

2. The computer system of claim 1 wherein the one or more sequences of instructions which when interpreted further cause:

selecting an explanation type from a plurality of explanation types based on the first set of context signals associated with the triggering event; and based on the selection of the explanation type, causing display of explanation text corresponding to the selected explanation type in association with a result item identifying a particular item matching the inferred query, wherein the explanation text identifies one or more particular context signals of the first set of context signals that were a basis for a selection of the particular item as an item matching the inferred query.

3. The computer system of claim 2 wherein the one or more sequences of instructions which when interpreted further cause:

receiving from the computer device information that a context signal of the one or more particular context signals has been modified;

determining a modified query based at least in part on the first set of context signals associated with the triggering event and the information that the context signal has been modified;

selecting an item matching the modified query.

4. The computer system of claim 1 wherein the one or more sequences of instructions which when interpreted further cause:

determining information to include with the inferred query, wherein the information is associated with an identity of a user logged onto the computer device when the triggering event occurred and provided by the user before the triggering event;

wherein the selecting one or more items further comprises selecting, based at least in part on the information included with the inferred query, the one or more items matching the inferred query.

5. The computer system of claim 4 wherein the information to include with the inferred query comprises an indication of items previously selected or liked by the computer device that caused the occurrence of the triggering event.

6. The computer system of claim 4 wherein the information to include with the inferred query comprises an indication of items previously selected by other client devices when presented with results based on certain context signals that belong to the first set of context signals.

7. The computer system of claim 1 wherein the one or more sequences of instructions which when interpreted further cause:

determining, based on text analysis of information provided by a user, mood data specifying a mood of the user associated with a client device that caused the occurrence of the triggering event; and identifying one or more items matching the inferred query based on the mood data for the user.

8. The computer system of claim 1 wherein the one or more sequences of instructions which when interpreted further cause:

determining, based on information from at least one of a user's messages, location data, transaction history, demographic data, or personal calendar, intention data specifying an intention of the user associated with a client device that caused the occurrence of the triggering event based on transaction data; and identifying one or more items matching the inferred query based on the intention data for the user.

9. The computer system of claim 8 wherein the one or more sequences of instructions which when interpreted further cause:

causing display of a prompt identifying the determined intention and requesting verification of the determined intention; and identifying one or more items matching the inferred query based on a response to the prompt.

10. The computer system of claim 1 wherein the one or more sequences of instructions which when interpreted further cause:

causing presenting of results of the inferred query at a particular client device;

receiving feedback associated with a particular result; and using the received feedback in selecting additional items for the particular client device or other client devices.

11. The computer system of claim 1 wherein the one or more sequences of instructions which when interpreted further cause:

selecting a media item from a plurality of media items associated with a particular item of the one or more items matching the inferred query; and causing display of the selected media item in association with a result item identifying the particular item.

12. The computer system of claim 11 wherein the one or more sequences of instructions which when interpreted further cause:

selecting the media item from the plurality of media items associated with the particular item based on information determined about a user associated with a client device that caused the occurrence of the triggering event, selection history information indicating result items selected by other client devices after receiving items, and information determined about users of the other client devices.

13. The computer system of claim 1 wherein the one or more sequences of instructions which when interpreted further cause:

causing reservation of a particular result item of the one or more result items; and causing display of a prompt identifying the particular item and requesting confirmation of the reservation.

14. A computer-implemented method comprising:

receiving data indicating that instructions for an application have begun executing on a computer device;

receiving from the computer device data regarding a triggering event that occurred when the instructions for the application were executed on the computer device, the triggering event being a user request for a recommendation that specifies a first set of parameters of the recommendation;

in response to receiving the data regarding the triggering event, causing the computer device to transmit a first set of context signals that were gathered at the computer device, wherein the first set of context signals comprise at least location information specifying a location of the computer device when the triggering event occurred;

receiving, from the computer device, the first set of context signals at the computer system;

without receiving an explicit query from the computer device, determining an inferred query that specifies a second set of parameters of the recommendation based at least in part on the location information from the first set of context signals associated with the triggering event, the second set of parameters being different from the first set of parameters;

selecting one or more items matching the inferred query based on at least in part on the first set of context signals associated with the triggering event; and causing display of one or more results items identifying the one or more matching items at the computer device.

15. The computer-implemented method of claim 14, further comprising:

selecting an explanation type from a plurality of explanation types based on the first set of context signals associated with the triggering event; and based on the selection of the explanation type, causing display of explanation text corresponding to the selected explanation type in association with a result item identifying a particular item matching the inferred query, wherein the explanation text identifies one or more particular context signals of the first set of context signals that were a basis for a selection of the particular item as an item matching the inferred query.

16. The computer-implemented method of claim 15, further comprising:

receiving from the computer device information that a context signal of the one or more particular context signals has been modified;

determining a modified query based at least in part on the first set of context signals associated with the triggering event and the information that the context signal has been modified;

selecting an item matching the modified query.

17. The computer-implemented method of claim 14, further comprising:

determining information to include with the inferred query, wherein the information is associated with an identity of a user logged onto the computer device when the triggering event occurred and provided by the user before the triggering event;

wherein the selecting one or more items further comprises selecting, based at least in part on the information included with the inferred query, the one or more items matching the inferred query.

18. The computer-implemented method of claim 14, further comprising:

determining, based on information from at least one of a user's messages, location data, transaction history, demographic data, or personal calendar, intention data specifying an intention of the user associated with a client device that caused the occurrence of the triggering event based on transaction data; and identifying one or more items matching the inferred query based on the intention data for the user.

19. One or more storage media storing instructions which, when executed by one or more processors, cause:

receiving data indicating that instructions for an application have begun executing on a computer device;

receiving from the computer device data regarding a triggering event that occurred when the instructions for the application were executed on the computer device, the triggering event being a user request for a recommendation that specifies a first set of parameters of the recommendation;

in response to receiving the data regarding the triggering event, causing the computer device to transmit a first set of context signals that were gathered at the computer device, wherein the first set of context signals comprise at least location information specifying a location of the computer device when the triggering event occurred;

receiving, from the computer device, the first set of context signals at the computer system;

without receiving an explicit query from the computer device, determining an inferred query that specifies a second set of parameters of the recommendation based at least in part on the location information from the first set of context signals associated with the triggering event, the second set of parameters being different from the first set of parameters;

selecting one or more items matching the inferred query based on at least in part on the first set of context signals associated with the triggering event; and causing display of one or more results items identifying the one or more matching items at the computer device.

20. The one or more storage media storing instructions of claim 19 which, when executed by one or more processors, further cause:

selecting an explanation type from a plurality of explanation types based on the first set of context signals associated with the triggering event; and based on the selection of the explanation type, causing display of explanation text corresponding to the selected explanation type in association with a result item identifying a particular item matching the inferred query, wherein the explanation text identifies one or more particular context signals of the first set of context signals that were a basis for a selection of the particular item as an item matching the inferred query.

* * * * *